RAY E. GARDNER
INVENTOR.

ATTORNEYS

July 2, 1974  R. E. GARDNER  3,822,169
ULTRASONIC FILM SPLICING APPARATUS
Original Filed June 16, 1969  7 Sheets-Sheet 3
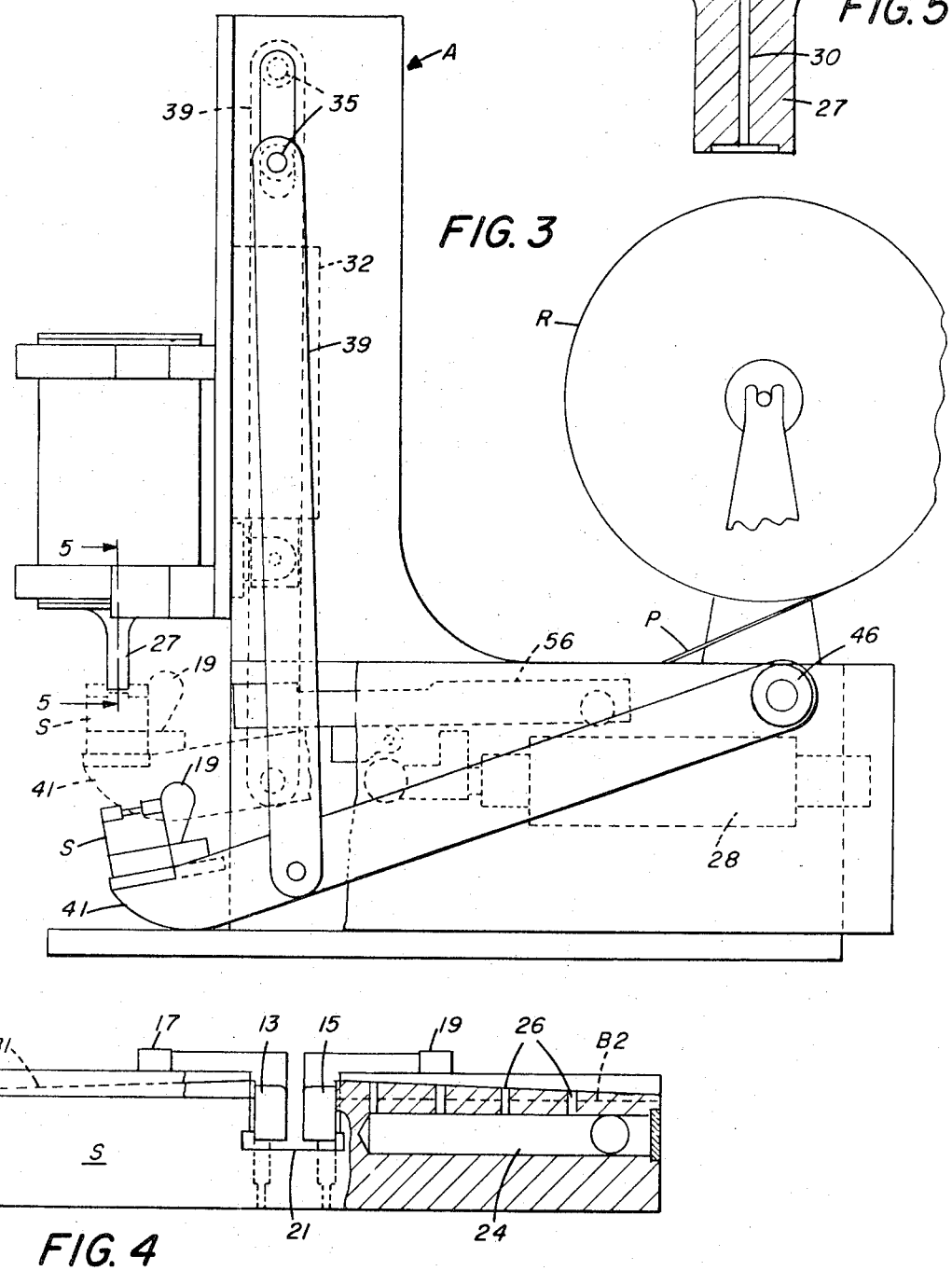
RAY E. GARDNER
INVENTOR.
BY
ATTORNEYS

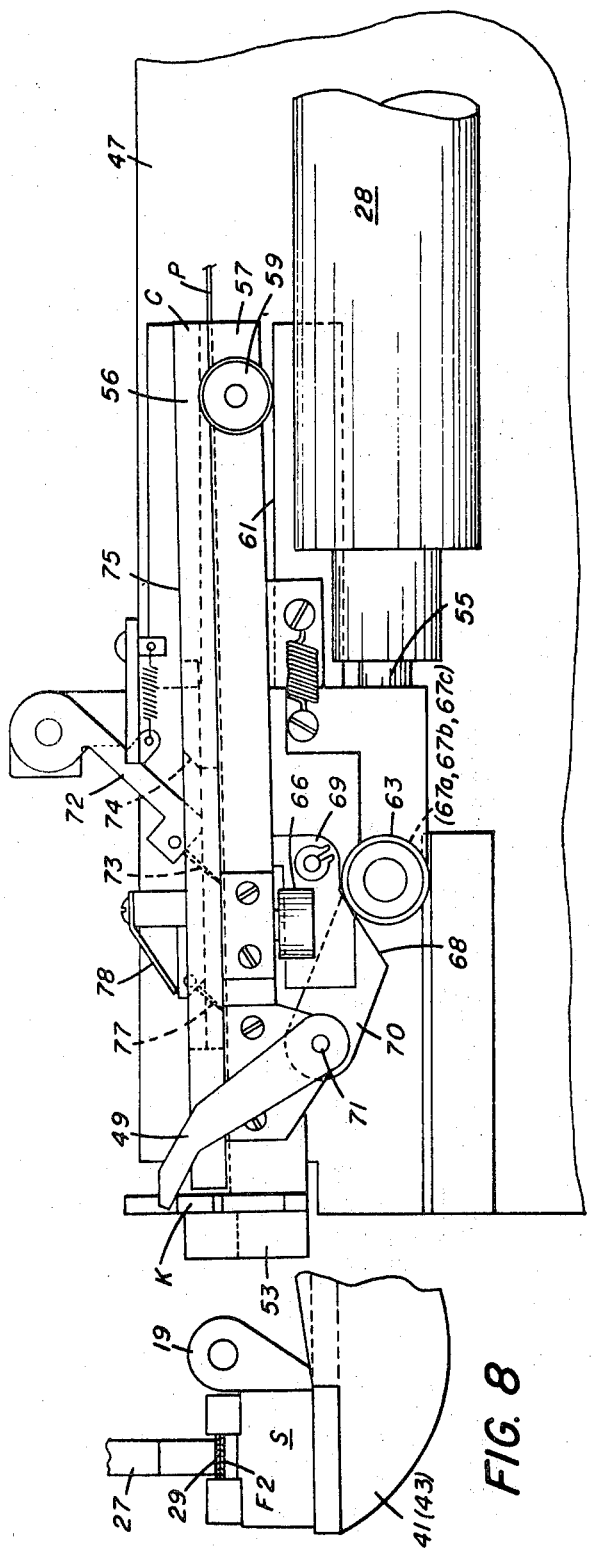

July 2, 1974
R. E. GARDNER
3,822,169
ULTRASONIC FILM SPLICING APPARATUS
Original Filed June 16, 1969
7 Sheets-Sheet 6
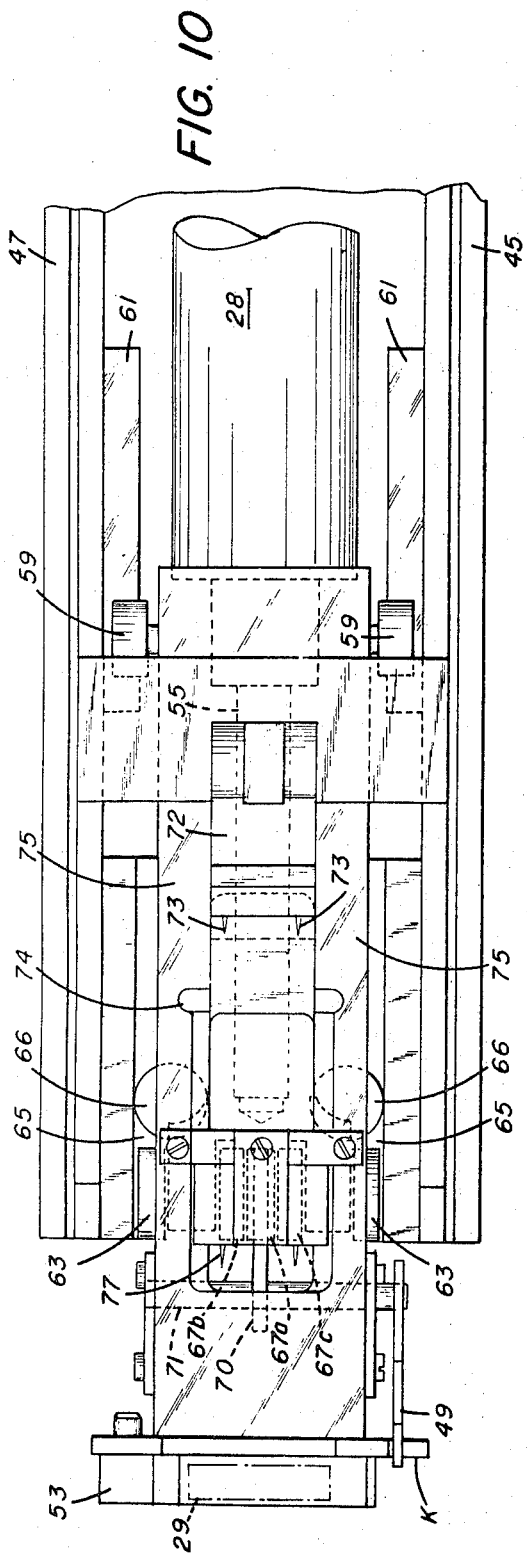
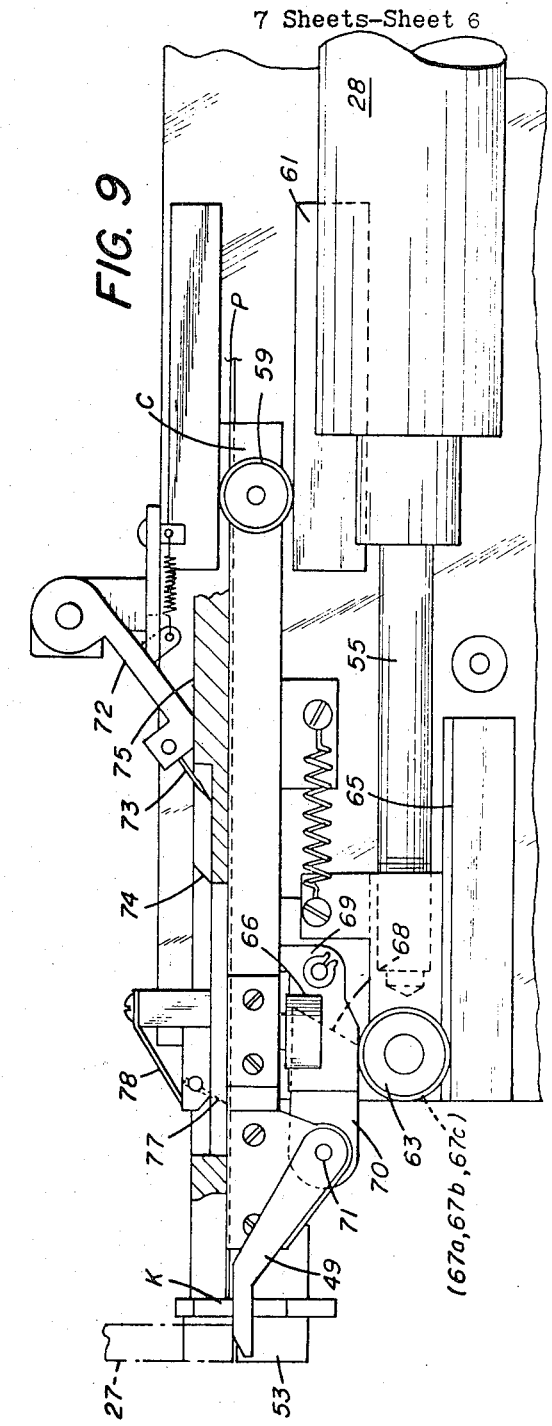
RAY E. GARDNER
INVENTOR.
ATTORNEYS

United States Patent Office 3,822,169
Patented July 2, 1974

3,822,169
ULTRASONIC FILM SPLICING APPARATUS
Ray E. Gardner, Rochester, N.Y., assignor to
Eastman Kodak Company, Rochester, N.Y.
Original application June 16, 1969, Ser. No. 833,438, now
Patent No. 3,647,599. Divided and this application
Nov. 8, 1971, Ser. No. 196,589
Int. Cl. B32b 31/04
U.S. Cl. 156—545
3 Claims

ABSTRACT OF THE DISCLOSURE

Apparatus for ultrasonically splicing together end-to-end two lengths of moving picture film or the like with a patch of splicing tape therebetween, comprising an ultrasonic horn, a stage for the lengths of film which is movable toward and away from the horn, tape feeding mechanism for intermittently feeding tape from a roll into position on the surface of said horn, and mechanism for cutting a patch of the desired width from the end of said tape. The stage and the horn are provided with vacuum apertures for holding the films and the patch in place. An automatic control system acts to perform the operating steps in the necessary sequence.

CROSS REFERENCE TO RELATED APPLICATION

This is a division of U.S. patent application Ser. No. 833,438, filed June 16, 1969, now U.S. Pat. No. 3,647,599.

BACKGROUND OF THE INVENTION

Field Of The Invention

The present invention relates to a novel apparatus for ultrasonically splicing together two lengths of thermoplastic film or other web, such as moving picture film, other photographic films, or magnetic recording tape.

When handling film in such operations as processing, printing, and projection it is frequently necessary to splice two lengths together. Particularly, when developing photographic film it is customary to join or splice together a series of separate rolls of exposed film which are then passed as a continuous belt into and out of a series of aqueous processing solutions. It is imperative that the splice be strong, as a failure of a single splice during the processing operation may mean the loss of several rolls of film before the failure has been detected and rectified. The problem is particularly acute with very narrow motion picture films, such as 8 mm. film, because the area available for splicing is so much smaller than with the wider films.

Also, a leader of thermoplastic film (usually uncoated) must be spliced to the first length of the film to be processed to lead it into the processing solutions. A similar leader often is spliced to a length of processed film to lead it into the projector.

The Prior Art

It has been customary in the past to join successive rolls of film together by applying to the trailing and leading ends mechanical fasteners such as staples or rivets; or an adhesive patch of material such as kraft paper having a coating of thermoplastic material which is activated by applying a heated anvil to the patch. The former tend to weaken and damage the film as the result of punching holes in the film, as well as scratching film. The latter have not been as strong as desired because the heat-activated adhesive only adheres to the coating on the film base, and thus is no stronger than the tenactiy with which the coating itself adheres to the film base. The film base carriers a ram jet antihalation layer on one side customarily, but this layer is tailored so as to adhere relatively weakly to the film base, and is purposely removed by dissolving in the alkaline processing solutions. Consequently, it has been impossible to heat splice a patch to the rem jet layer and expect to maintain the splice during processing.

Moreover, with heat splicing a dwell time is needed to permit the plastic to set, and it is frequently necessary to apply a stream of cooling air to expedite setting.

The silver halide gelatin emulsion on the other side of the film base generally adheres to the film base much more strongly, and permits a generally satisfactory splice by heat splicing. However, it would be particularly desirable for the patch to adhere directly to the film base so that there would be no problem related to the degree of adherence of the coating to the base. This is particularly troublesome for films carrying the recently introduced softer emulsions, which have relatively low internal strength and may tend to pull apart.

In U.S. Patent Application Ser. No. 785,913, now U.S. aPt. 3,661,667, filed by me jointly with William W. Voelckers and George T. Negus on Dec. 23, 1968, (incorporated by reference herein), there is described and claimed a novel ultrasonic apparatus and method for splicing film wherein two lenths of thermoplastic film are connected together by positioning them in longitudinal alignment with one another end-to-end so that the trailing end of one length is adjacent the leading end of the other length. A short piece of splicing tape is then positioned in overlapping relation on narrow transverse areas of the film lengths adjacent their ends and bridging the space therebetween. The splicing tape has at least a surface portion comprising a thermoplastic resin which is in contact with the surface of the film. Ultrasonic energy is then applied from a transducer through a metal horn which is in contact with the overlapping portions of the tape and the film lengths, thereby uniting the tape to the film lengths. This method is praticularly advantageous when the splicing tape is applied on the rem jet side of the film, as the ultrasonic energy then seems to develop sufficient local heat at the interfaces so as to melt and stir together the rem jet layer and the adjoining surface areas of film base and splicing tape, causing the melted rem jet to disperse in the melted thermoplastic layers.

SUMMARY OF THE INVENTION

The apparatus of the present invention has been created to carry out the method described above rapidly, efficiently, and automatically. Basically, the apparatus comprises a stage upon which the operator places the ends of the two lengths of film to be joined in end-to-end longitudinally spaced relationship, an ultrasonic horn having an end surface adapted to bridge the space between the lengths and to overlap portions of the ends thereof, first means for effecting relative movement between the stage and the horn toward and away from one another axially of the horn, second means for feeding an end portion of a length of splicing tape into splicing position between the stage and the end surface of the horn, and third means for cutting off the end portion of the tape to form a rectangular patch having the desired shape and size.

As in the case of copending application 785,913, the stage is provided with a central recess into which a pair of trimming knives can be moved by the operator so as to trim protruding ends of film to provide an accurate space for the patch to bridge.

Also, there is provided an automatic control system which the operator initiates after properly positioning the film on the stage. This control system comprises timing mechanism for sequentially actuating electrical control switches to perform the required operations successively in timed relationship. Also included in the control system are several switches controlling the application of vacuum to the stage and to the ultrasonic horn for the purpose of holding the film lengths on the stage and the patch on the bottom surface of the horn. Upon completion of a splicing cycle the timing mechanism then acts to restore the system to its initial condition in preparation for the next splicing operation.

THE DRAWINGS

The invention will be described more in detail hereinafter with reference to the drawings wherein:

FIG. 3 is a side elevational view, on a reduced scale, of the apparatus as viewed from the right in FIGS. 1 and 2;

FIG. 4 is a front elevational view of the stage, partly broken away and in vertical section;

FIG. 5 is a fragmentary vertical sectional view on an enlarged scale of the ultrasonic horn taken along the line 5—5 in FIG. 3;

FIG. 7 is a side elevational view of the splicing tape feed mechanism in withdrawn position, corresponding to FIG. 3 with a side plate removed;

FIG. 8 is a fragmentary side elevational view of the stage and horn in splicing position, corresponding to FIGS. 2 and 3;

FIG. 9 is a side elevational view of the tape feed mechanism corresponding to FIG. 7, after the splicing tape has been moved into position to deposit a patch on the ultrasonic horn;

FIG. 10 is a plan view of the tape feed mechanism in the advanced position shown in FIG. 9.

THE PREFERRED EMBODIMENTS

Positioning The Film

Figure 1:
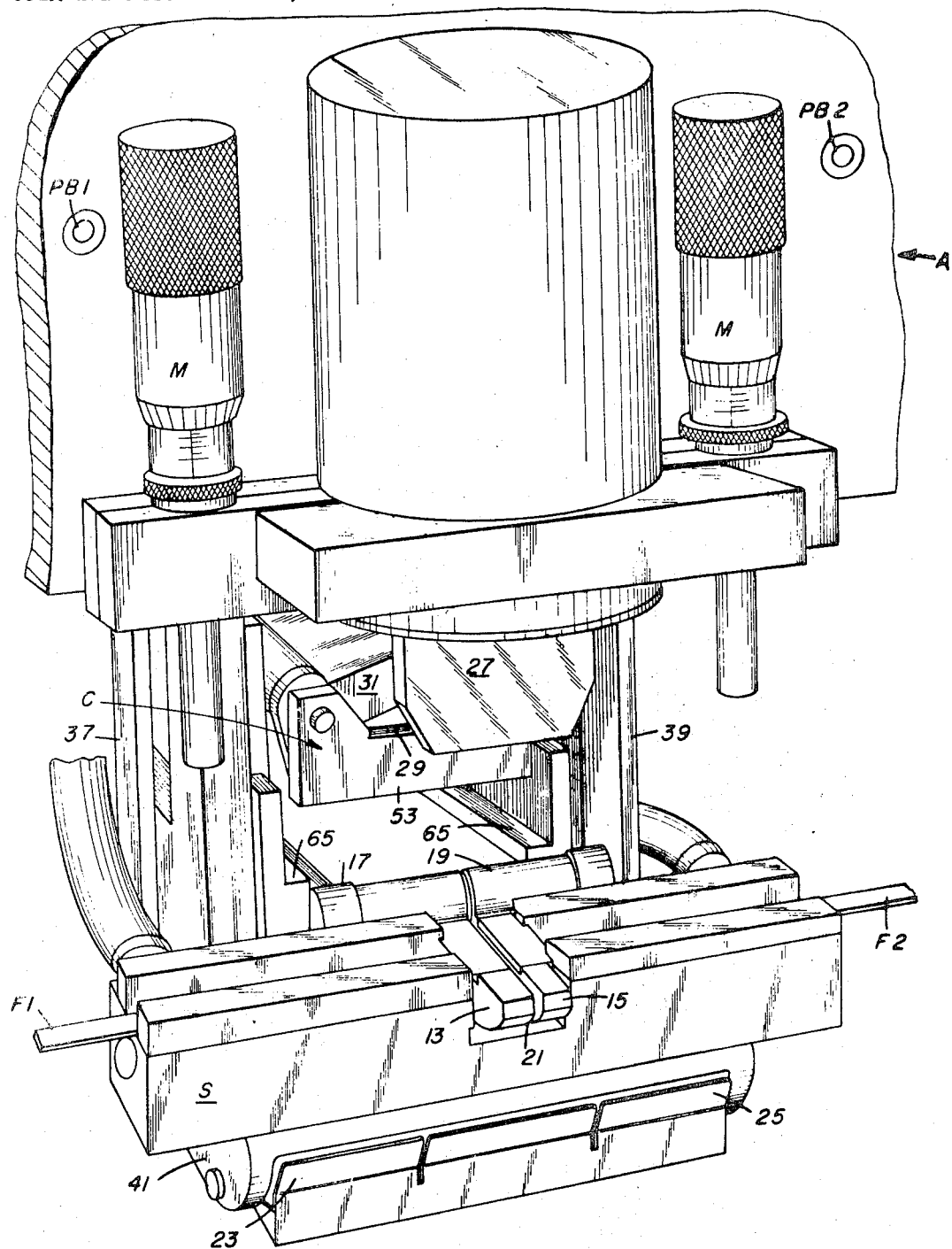
FIG. 1 is a perspective view looking at the splicing apparatus from the front, and with the stage and horn separated from one another in readiness to commence a splicing operation.

Referring to FIGS. 1 and 4, the machine operator raises two trimming knives 13 and 15 on their pivots 17 and 19 so that they are out of a central recess 21 and well above the top of the stage S. Then she positions an end of a length of film F1 within a channel on the top surface of the left-hand side of the stage with its end even with or protruding slightly beyond the edge of recess 21, and presses a switch actuating finger 23 which introduces a vacuum to the left side to hold the film down. Then she positions the other length of film F2 on the right side of the stage with its end even with or protruding slightly beyond the edge of recess 21, and presses a switch actuating finger 25 to introduce vacuum to hold the latter film down. The manner by which the switch actuating fingers 23 and 25 introduce vacuum will be described more in detail hereinafter in connection with the automatic control system shown in FIG. 11.

Usually the ends of films F1 and F2 protrude beyond the edges of recess 21, and after each length of film is positioned, the knife blades 13 and 15 are individually swung downwardly by the operator to cut off the protruding ends of the films to provide accurate spacing. The knife blades drop back into recess 21 below the floor of the stage where they are out of the way of the ultrasonic horn.

FIG. 4 shows stage S as having two floors sections B1 and B2 which are inclined downwardly in opposite directions away from a center line, as described in the copending application. Each side of the stage has a longitudinal vacuum manifold 24 from which a plurality of vertical ducts 26 extend to the adjacent floor surface.

The Splicing Operation

Figure 11:
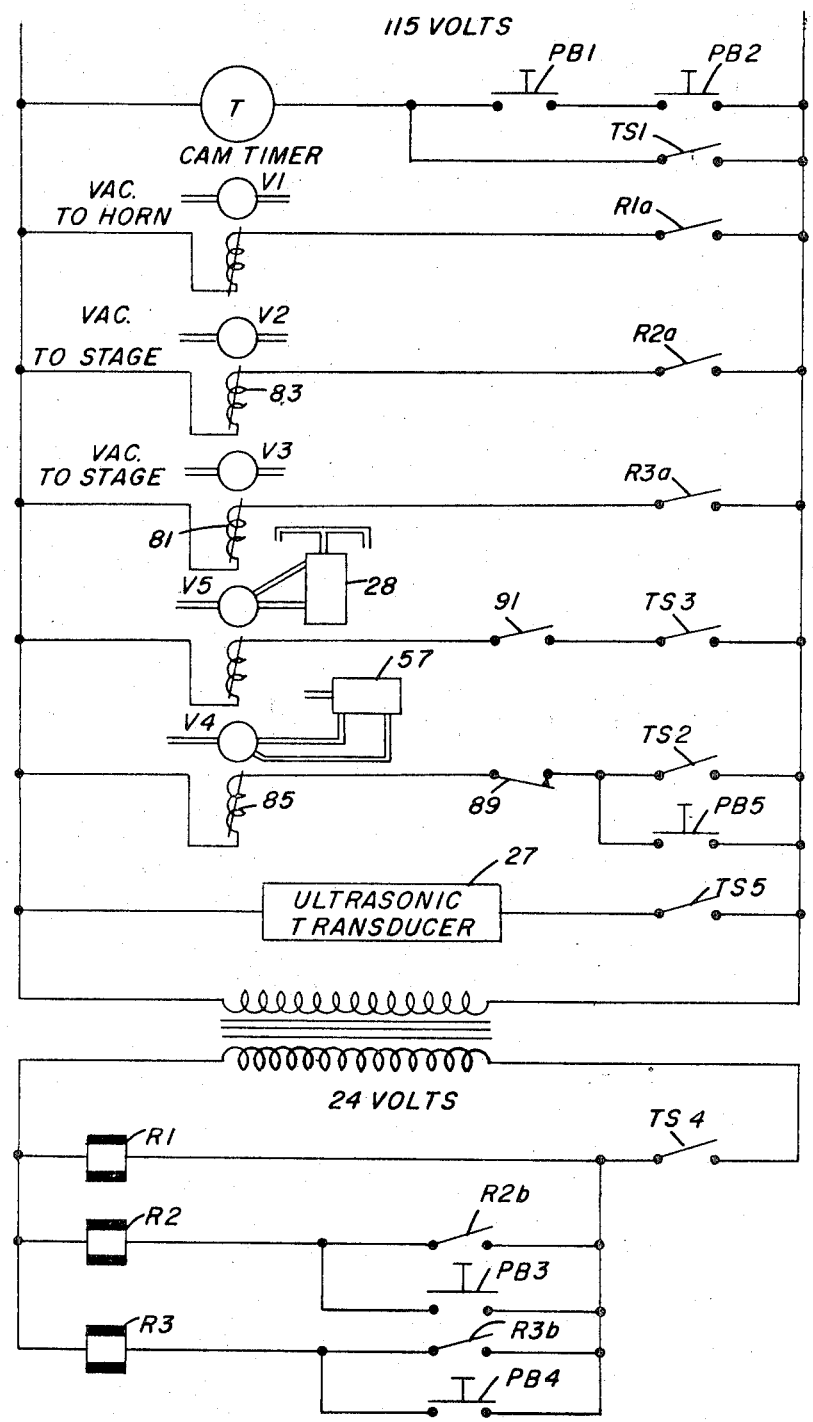
FIG. 11 is a schematic electrical diagram for the automatic control system.

With a splicing patch in place on the bottom surface of horn 27 (placed there in a manner to be described), the operator then presses two manual control switches PB1 and PB2 on the body or frame A of the machine to initiate a splicing cycle which is automatic throughout, as will be described in detail with reference to FIG. 11.

Figure 2:
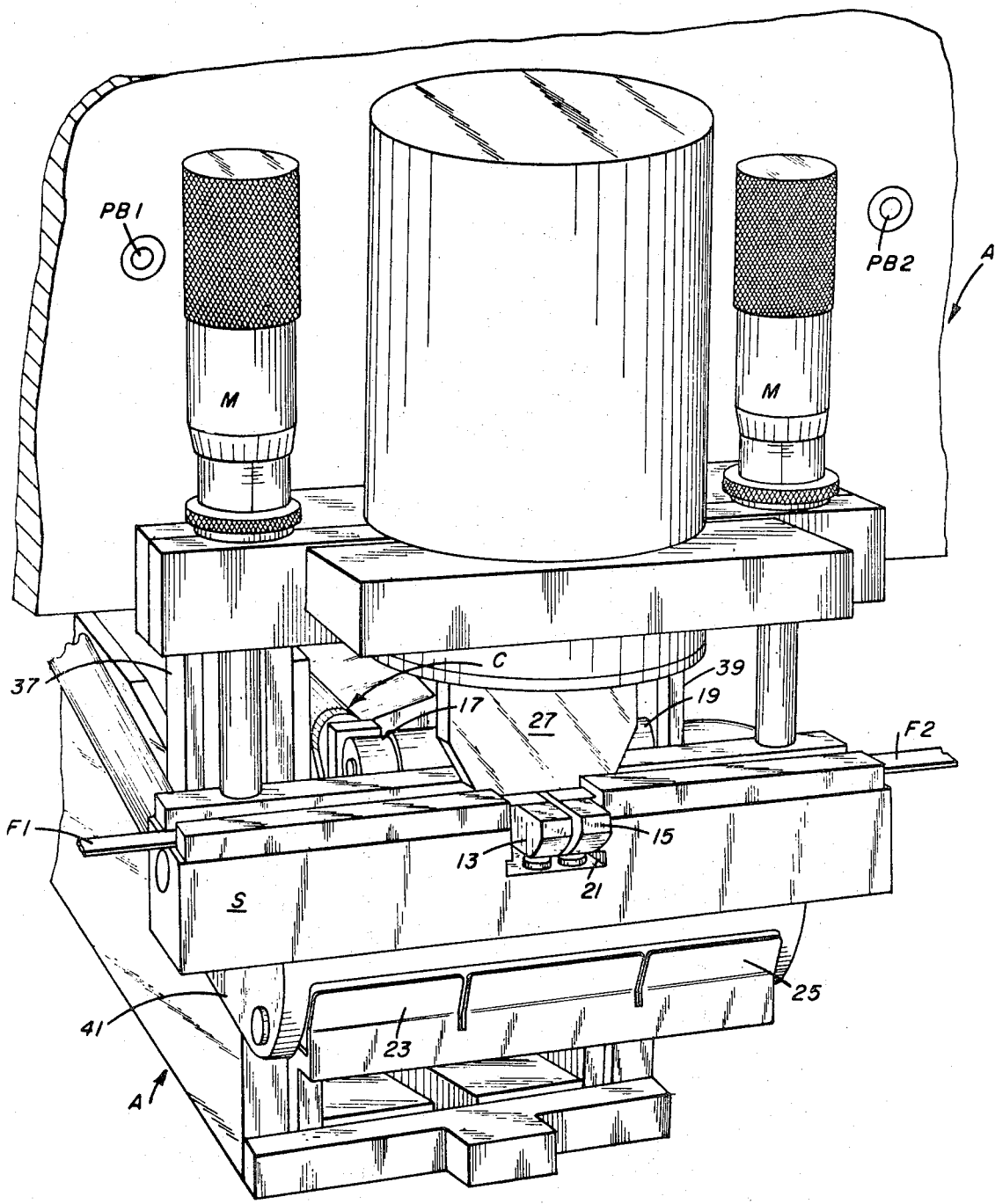
FIG. 2 is a perspective view corresponding to FIG. 1, but showing the stage raised to the horn, in the splicing position.
Figure 6:
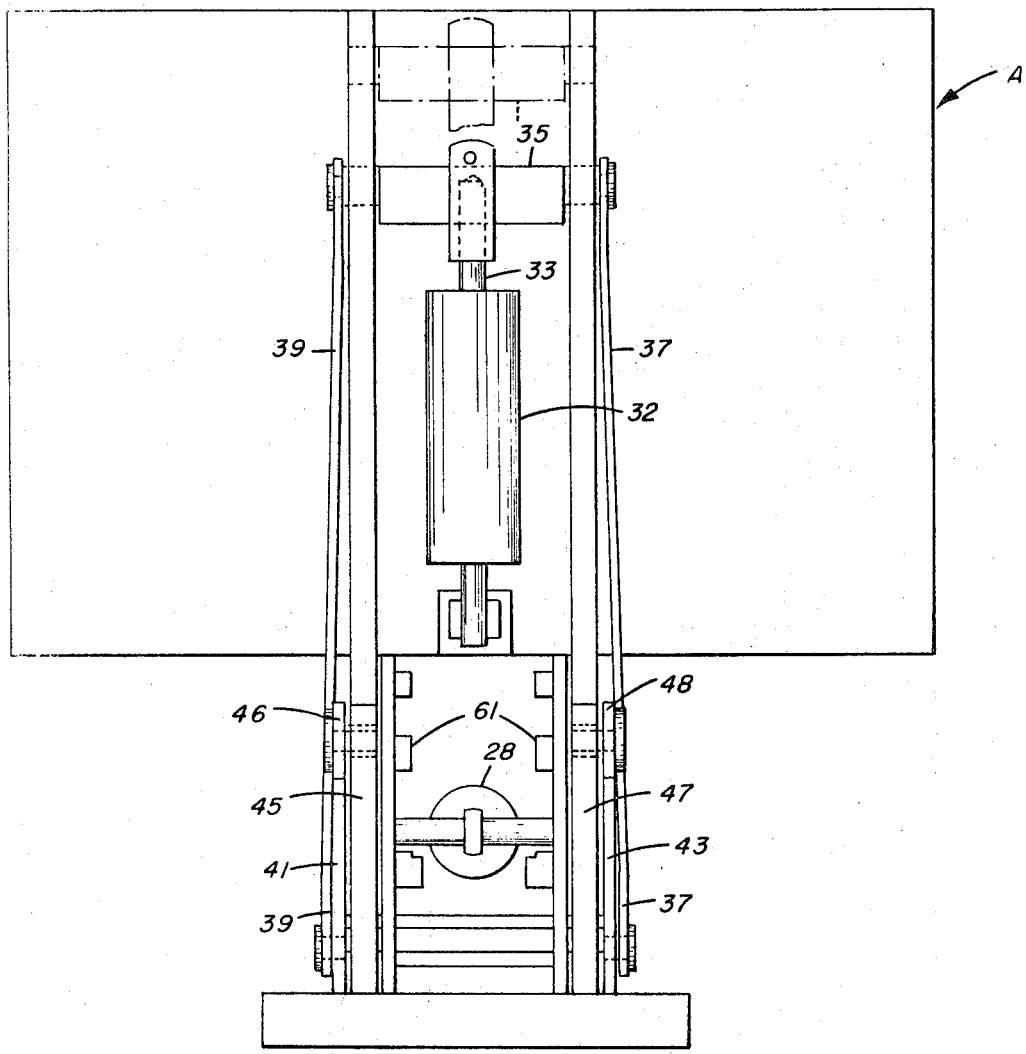
FIG. 6 is a rear elevational view of the apparatus as seen from the right in FIG. 3, with the roll of splicing tape omitted for clarity.

Pressure fluid is introduced into a cylinder 32 on the back of the framework A and moves a piston rod 33 and crosshead upwardly. The crosshead 35 is connected at both ends to downwardly extending connecting links 37 and 39 which are pivotally connected to a pair of lever arms 41 and 43 which carry the stage S at the free ends thereof and are pivoted at their rear ends on side members 45 and 47 of the apparatus at 46 and 48. This movement brings the stage S into juxtaposition with the patch on the bottom surface of the horn 27, as shown in FIG. 2, and in dash lines in FIG. 3. When these make contact, the stage is still approximately .022 inch away from touching a pair of micrometer stops M (which may or may not be used).

At this moment the transducer of ultrasonic horn 27 is energized to produce ultrasonic vibrations, of say 20 to 40 kilocycles per second. After the horn has been energized, the sandwich is softened to a point which allows the constantly pushed stage to compress the splice sandwich about .022 inch. The micrometers, when used, control the amount of compression and also tend to level the stage in relation to the horn, if leveling is needed.

The vibrations are applied for a short length of time (a few seconds) so as to unite the patch 29 to the two films. Then the vacuum to stage S is released, the cylinder 32 is provided with pressure fluid so as to move the piston rod 33 and associated linkages downwardly to carry the stage S back to its initial position, the vacuum holding the film on stage S is released, and the spliced film is removed by the operator. The entire cycle can be performed in six seconds, more or less.

Feeding The Splicing Tape

Next, pressure fluid is introduced into a horizontal cylinder 28 and the retracted carriage C shown in FIGS. 7, 9 and 10 is moved in a direction transversely toward the horn 27 (toward the left). Such movement unrolls a length of splicing tape P from a roll R and carries a protruding end 29 of tape directly under, and then up into contact with, the bottom surface of horn 27. A knife blade K is then moved downwardly to cut off the end of the tape and leave a rectangular splicing patch adhered to the bottom of the horn by a vacuum drawn through a central vacuum passage 30 (see FIG. 5). Then the carriage C moves back toward its original position carrying the remainder of tape P therewith.

The functions described generally above for feeding the splicing tape P are performed by the specific apparatus now to be described. Referring to FIGS. 1 and 7, the end 29 of the tape P protrudes onto a shelf 53, and a piston rod 55 and associated piston are withdrawn rearwardly into cylinder 28. When it is time to move the tape end 29 into position on the horn 27, pressure fluid is introduced into cylinder 28 and moves the piston rod 55 toward the left in FIG. 7. During this movement the tape P, which is lightly held between the upper and lower parts 56 and 57 of carriage C, travels to the left with the carriage as the latter rolls on a pair of wheels 59 on opposite sides of the carriage, rolling on tracks 61; and on another pair of wheels 63 rolling on tracks 65. Movement of the carriage sideways is prevented by vertically journalled wheels 66 rolling against side plates.

Near the end of its stroke, when the shelf 53 is under horn 27, a centrally located cam wheel mechanism 67 encounters a tapered surface on a vertically bifurcated cam 69 and raises the front end of the carriage so that the shelf 53 and the protruding tape end 29 are forced up against the bottom surface of the ultrasonic horn 27. Immediately thereafter, the cam wheel mechanism 67 moves against a tapered surface 68 on a lever arm 70 which is carried on a common shaft 71 with the knife actuating arm 49, thus pivoting arm 49 downwardly in contact with the end of knife K, causing it to cut the short protruding end 29 free from the length of tape P to form a rectangular patch which is held on the bottom of horn 27 by vacuum. While a single cam wheel mechanism 67 is described, it actually is composed of three separate wheels spaced along the same horizontal shaft, a central wheel 67a within bifurcated cam 69 for engaging knife-actuating lever arm 70, and two outside wheels 67b and 67c engaging the two sides of cam 69.

During this movement of the carriage to the left, a spring tensioned pivoted arm 72 carrying a pair of needles 73 on its free end is held out of contact with the tape P by a cam surface comprising an incline 74 and a flat surface 75.

When the carriage C returns toward the right after depositing a patch 29 on the horn 27, arm 72 descends incline 74 to bring the needles 73 bacg into contact with the tape P during the last portion of the rearward stroke. As the stroke continues, the tape is held stationary by needles 73 and another short length 29 appears on the shelf 53 in preparation for the next splicing operation.

A second pair of needles 77, which move back and forth with the carriage, is lightly pressed against the tape by a leaf spring 78 for holding the tape so it will move forward with the carriage, and as an anti-backup device for the tape.

Successful operation has been achieved with a 2-inch stroke of piston rod 55, the first 1½ inches of which slides carriage C against a stop so that shelf 53 is directly beneath, but spaced from, horn 27. The next ½ inch of travel of the piston rod cams the shelf up against the horn and operates knife K to deposit a patch 5/16-inch wide on the horn.

During the carriage's return stroke, the needles 73 are engaged with the tape for the last 5/16 inch of travel.

The tape actuating mechanism described above constitutes a unit which is removably bolted to frame A, and which can be rmoved from the apparatus for repair, or for replacement with a similar unit.

The Automatic Control System

When the operator places on stage S the two ends of film to be spliced and presses the switch fingers 23 and 25, she closes two switches PB3 and PB4, thus completing a circuit through timer switch TS4, which has been left closed at the end of the previous cycle, thus energizing two relays R2 and R3 in a 24-volt part of the system. The energized relays close two holding switches R2b and R3b, and also close two switches R2a and R3a in the 115-volt portion of the system to energize solenoids 81 and 83 which actuate the vacuum control valves V2 and V3 to hold down the films.

The operator then closes the two main control switches PB1 and PB2 to start the operation of cam switch timer T. Only one switch would suffice, but by requiring that two be actuated, both the operator's hands are out of the way of the moving parts, as a safety feature. Timer T first closes, and keeps closed for the entire cycle, a holding switch TS1 which maintains energization of timer T even though the two push-button switches have now returned to their normally open position.

Next the timer closes switch TS3 to energize solenoid 87 and operate valve V5 which admits pressure fluid to cylinder 32 for raising stage S into engagement with the ultrasonic horn 27 (having a splicing patch on its end surface) to effect the splicing operation.

Simultaneously, timer T actuates switch TS5 which energizes the transducer of ultrasonic horn 27 to effect the welding of patch to film. A built-in timer deenergizes horn 27, and timer T reopens switches TS3 and TS4 to release all vacuum and to return the stage S to its initial position.

Next in sequence a switch TS2 is closed by timer T, thus energizing a solenoid 85 to control a fluid valve V4 which admits pressure fluid into the cylinder 28 for moving carriage C toward the left in FIG. 7 to deposit the next patch on the bottom of horn 27. Simultaneously, closed switch TS4 energizes relay R1, closing switch R1a to operate valve V1 which admits vacuum to horn 27 for holding the patch in place. Then timer T reopens switch TS2 to return carriage C to its starting position, during which movement tape for the next patch is fed into position, as previously described.

The operator then removes the spliced film and replaces it with the next films to be spliced. Then timer T recloses TS4 and reopens TS1., Simultaneous movement of carriage C and stage S is prevented by a pair of switches 89 and 91 which are actuated alternately by physical contact with the carriage and stage mechanisms, one switch being open and the other closed at any given time in the cycle. A manual push button switch PB5 permits operation of the tape feed mechanism independently of the automatic control.

Stage S may be constructed of hardened steel or other hard metal. The pressure fluid for operating the apparatus may be compressed air, or hydraulic liquid such as oil.

Splicing tape P can be green kraft paper coated with a thermoplastic adhesive such as a commercially available adhesive comprising a butadiene-acrylonitrile copolymer (a nitrile rubber) mixed with a phenol-aldehyde resin. One suitable adhesive is sold by National Starch and Chemical Company as Resyn 36–6326. Other suitable adhesives are described in Canadian Pat. 564,192 and British Pat. 785,403. Other suitable thermoplastic tape materials are polyethylene and polyethylene terephthalate.

Ultrasonic vibrations can be generated in a way well known to the ultrasonics art; for example, as described in U.S. Pat. 3,022,814 of A. G. Bodine, Jr.

The films to be spliced can be polyethylene terephthalate, cellulose acetate, cellulose nitrate, polyethylene, polyvinyl chloride, copolymers of polyvinyl chloride and polyvinyl acetate, and polyvinylidene chloride. Thicknesses can range from 0.001 inch up to 0.015 inch.

While the principles have been described with a movable stage and a stationary horn, it is evident that they can also be applied to a stationary stage and a movable horn.

The invention has been described in detail with particular reference to preferred embodiments thereof, but it will be understood that variations and modifications can be effected within the spirit and scope of the invention.

I claim:

1. Splicing tape feed mechanism for use in an ultrasonic welding splicing apparatus comprising in combination:

a carriage for splicing tape;
   mechanism for moving said carriage and tape forward and backward lengthwise of said tape;
   and means coacting with said carriage and the tape thereon during movement thereof in a backward direction, for moving said tape forward along said carriage a distance equal to the width of patch to be cut from said tape.

2. Mechanism in accordance with claim 1 wherein said last named means comprises a stationary frame;
   gripping means on said frame movable into and out of gripping engagement with such length of splicing tape; and
   means on said carriage holding said gripping means out of engagement with such length of splicing tape during a first portion of the backward movement of said carriage, but permitting engagement with said tape during the latter portion of such movement.

3. Mechanism in accordance with claim 1 also comprising:
a knife on said carriage positioned transversely of such length of tape; and
knife actuating means on said carriage engageable with said knife and actuatable upon completion of a forward stroke of said carriage to cut off such patch.

References Cited
UNITED STATES PATENTS

| | | | |
|---|---|---|---|
| 3,394,040 | 7/1968 | Baumbach | 156—505 |
| 3,510,384 | 5/1970 | Quarve | 156—505 |
| 3,577,302 | 5/1971 | Szakacs | 156—504 |
| 3,642,555 | 2/1972 | Nagoshi et al. | 156—157 X |
| 3,677,864 | 7/1972 | Morse et al. | 156—502 X |

WILLIAM A. POWELL, Primary Examiner

U.S. Cl. X.R.

156—505

UNITED STATES PATENT OFFICE
CERTIFICATE OF CORRECTION

Patent No. 3,822,169      Dated July 2, 1974

Inventor(s) Ray E. Gardner

It is certified that error appears in the above-identified patent and that said Letters Patent are hereby corrected as shown below:

Column 1, line 72, after the word "base", 2nd occurence, insert the word --carries--; Column 1, line 72, delete the word "ram" and insert the word --rem--.

Column 2, line 21, delete the word "aPt." and insert --Pat.--; Column 2, line 25 delete the word "lenths" and insert --lengths--.

Column 4, line 24, change ".022" to --.002--.
Column 4, line 32, change ".022" to --.002--.

Column 5, line 27, delete the word "bacg" and insert the word --back--.

Column 6, line 58, delete the word "welding".

Signed and sealed this 12th day of November 1974.

(SEAL)
Attest:

McCOY M. GIBSON JR.
Attesting Officer

C. MARSHALL DANN
Commissioner of Patents